United States Patent [19]

Kepes et al.

[11] 4,417,041

[45] Nov. 22, 1983

[54] PROCESS FOR SHAPING SOLID POLYBUT-1-ENE AND THE RESULTING SHAPED ARTICLES

[75] Inventors: André Képès, Le Vesinet; Eric Weynant, Golfe Juan; Pierre Avenas, Sceaux; Jean-Marc Haudin, Antibes, all of France

[73] Assignee: Societe Chimique des Charbonnages-CdF Chimie, Mazingarbe, France

[21] Appl. No.: 339,160

[22] Filed: Jan. 13, 1982

Related U.S. Application Data

[62] Division of Ser. No. 85,949, Oct. 18, 1979, Pat. No. 4,324,756.

[30] Foreign Application Priority Data

Oct. 30, 1978 [FR] France ............................. 78 30701

[51] Int. Cl.$^3$ ................................................. C08F 110/08
[52] U.S. Cl. ................................................. 526/348.6
[58] Field of Search ................................................. 526/348.6

[56] References Cited

U.S. PATENT DOCUMENTS

| | | | |
|---|---|---|---|
| 3,175,999 | 3/1965 | Natta et al. | 526/348.6 |
| 3,265,648 | 8/1966 | Boor et al. | 526/348.6 |
| 3,435,017 | 3/1969 | Natta et al. | 526/348.6 |
| 3,686,388 | 8/1972 | Beckmann et al. | 264/339 |
| 3,846,522 | 11/1974 | Goldman | 264/325 |
| 4,187,158 | 2/1980 | Mack | 526/348.6 |
| 4,219,639 | 8/1980 | Mack et al. | 526/348.6 |

OTHER PUBLICATIONS

Ball et al., Solid–State Extrusion of Poly (1-butene), 15 Polymer Letters Edition, pp. 519–526 (1977).

*Primary Examiner*—Harry Wong, Jr.
*Attorney, Agent, or Firm*—Finnegan, Henderson, Farabow, Garrett & Dunner

[57] ABSTRACT

Shaped articles of polybut-1-ene are made by preheating a polymer blank in the crystalline form II at a temperature between 20° and 90° C. The preheated blank is then press-forged under a pressure between 8 and 100 kgf/mm$^2$ for a period of 1–40 seconds. During the shaping operation, the polymer is converted into the crystalline form I. Polybut-1-ene shaped articles are formed that have a melting peak, determined by differential thermal analysis, at 119° C.

12 Claims, No Drawings

PROCESS FOR SHAPING SOLID POLYBUT-1-ENE AND THE RESULTING SHAPED ARTICLES

This is a division of application Ser. No. 085,949, filed Oct. 18, 1979 now U.S. Pat. No. 4,324,756.

BACKGROUND OF THE INVENTION

The present invention relates to the conversion of plastics into finished articles and, more particularly, to the conversion of polybut-1-ene in the solid state.

It is known that the press-forging of certain thermoplastics enables finished articles having a large thickness or complicated shape to be manufactured cheaply, and that such articles cannot be satisfactorily manuactured by injection-molding. Thus, the press-forging of polypropylene and polyethylene is described in the following publications:

*Society of Plastics Engineers*, 26th Annual Technical Conference, New York, May 1968, pages 225–230;

*Plastics and Polymers*, Volume 38, April 1970, pages 124–130;

*Machine Design*, May 3, 1973, pages 94–99.

According to these publications, the press-forging of polyethylene and polypropylene is effected by heating the thermoplastic to a few degrees Centigrade below its melting point and subjecting it to a pressure of from 70 to 775 kgf/cm$^2$ for a period of from 15 to 60 seconds.

No satisfactory method is known at the present time for converting polybut-1-ene into finished articles having a large thickness or a complicated shape. We have therefore investigated the possibility of manufacturing such articles by the press-forging of polybut-1-ene and have found that it is not possible to do this by simply using the conditions and techniques already disclosed for the press-forging of polyethylene and polypropylene. Polybut-1-ene is distinguished from these thermoplastics by the existence of a particularly complex and pressure-dependent polymorphism phenomenon, as described in *J. Macromol. Sci. (Phys.)*, B1(2), pages 309–334 (1967). This phenomenon essentially manifests itself in the existence of a metastable crystalline form, referred to as the II form, which melts at 114° C., and a stable crystalline form, referred to as the I form, which melts at 130° C. Because of this phenomenon, lengthy experimentation has been required in order to determine the optimum conditions, from the industrial point of view, for the press-forging of polybut-1-ene.

SUMMARY OF THE INVENTION

In accordance with the purpose of the invention, as embodied and broadly described herein, the polybut-1-ene shaping process of the invention comprises a process for forming solid polybut-1-ene into a shaped article by preheating polybut-1-ene, in the II form, to a temperature of from 20° C. to 90° C. and then press-forging it under a pressure from 8 to 100 kgf/mm$^2$ for a period of from 1 to 40 seconds into a desired shape.

The preferred preheating temperature in accordance with the invention is between 40° and 80° C. The preferred pressure of press-forging in accordance with the invention is between 12 and 30 kgf/mm$^2$. The preferred period of press-forging is less than 12 seconds.

Advantages of the invention are that it is unnecessary to pre-heat the shaping apparatus, and the present invention can be used to achieve compression ratios of 65% to 85% without difficulty.

According to another aspect of the invention, as embodied and broadly described herein, the invention further comprises a press-forged polybut-1-ene article. The press-forged article may have a melting peak, determined by differential thermal analysis, at 119° C.

A still further aspect of the invention, as embodied and broadly described herein, comprises a polybut-1-ene shaped article having a melting peak, determined by differential thermal analysis, at 119° C. Preferably the shaped article is made according to the above-described process.

DESCRIPTION OF THE PREFERRED EMBODIMENTS

Reference will now be made in detail to the presently preferred embodiments of the invention.

The term "polybut-1-ene" is used herein to mean both but-1-ene homopolymer and block or random copolymers of but-1-ene with other monomers, in particular with olefins, such as ethylene and propene, and mixtures, in all proportions, of the homopolymer and one or more such copolymers and also mixtures of these polymers with inorganic fillers, such as talc. The preferred but-1-ene homopolymers are stereoregular polymers having a high isotacticity index (measured as the proportion of material insoluble in boiling diethyl ether), for example of more than 95%.

The term "press-forging" is used herein to refer to the so-called closed die press-forging process, as described in the above-mentioned *Society of Plastics Engineers*, 26th Annual Technical Conference, New York, May 1968, page 227, using, for example, a hydraulic press.

A first condition required by the process according to the invention is that the polymer that is to be press-forged be essentially in the II form. In fact, press-forging experiments carried out on the I form of the polymer have shown that the latter has a high elastic recovery, regardless of the duration of the press-forging operation.

A secod condition required by the process according to the invention is that the polymer be pre-heated, for example by means of an oven provided with a temperature control, to a temperature of from 20° to 90° C., preferably from 40° to 80° C. This ensures that, taking account of the self-heating caused by the press-forging, the latter will indeed be carried out on a material in the solid state. A particular advantage of polybut-1-ene compared with polyethylene and polypropylene is that the preheating temperature does not need to be very close to the melting point, as is the case for these two polymers, but can be considerably lower, which constitutes an appreciable energy savings.

A third condition required by the process according to the invention is that the press-forging pressure to which the polybut-1-ene is subjected be from 8 to 100 kgf/mm$^2$, preferably from 12 to 30 kgf/mm$^2$. These ranges of pressures are greater than the pressures currently used for press-forging polyethylene or polypropylene.

Finally, a fourth condition required by the process according to the invention is that the period for which this pressure is applied to the polybut-1ene be from 1 to 40 seconds. In particular, it has been found to be unnecessary, and even disadvantageous, to apply this pressure for a long period, as is the practice for other polymers. In fact, maintaining the pressure for an unduly long time damages the equipment used for applying the pressure and reduces the production rate without achieving any improvement in the quality of the press-forged article. Thus, in the case of most of the finished articles desired, it is sufficient to maintain the pressure for a period of less than 12 seconds.

Apart from the four above conditions, which are critical in defining a truly industrial and economical process, the process according to the invention has other parameters that are not critical. Thus, in contrast to the case of polypropylene and polyethylene, for which it is recommended, according to the prior art, to pre-heat the apparatus (die and punch) to a temperature of 65° to 75° C., this procedure is unnecessary in the case of the press-forging of polybut-1-ene and no technical difficulty has been encountered when carrying out the process according to the invention using cold apparatus. Furthermore, the polybut-1-ene blank can be arranged in any manner in the die, and articles of identical quality have been obtained by exactly centering the blank along the axis of the die, by arranging it off-center relative to this axis, and by arranging it in a random fashion in the die.

The novelty of the process according to the invention also lies in the fact that, in contrast to the process for press-forging polypropylene, for which compression ratios of the polymer (measured as the decrease in the thickness of the sample from the beginning to the end of the press-forging operation) of more than 63% do not seem to have been described, it is extremely easy to obtain compression ratios of from 65% to 85% in the present process.

It is important to note that the process according to the invention is accompanied by an instantaneous crystalline conversion of the polybut-1-ene, the latter essentially passing from the metastable II form to the stable I form. This conversion has been verified by taking a sample of material from the press-forged article and analyzing it by the well-known techniques of differential thermal analysis and X-ray diffraction, these two techniques enabling the II crystalline form, which melts at 114° C., to be unambiguously distinguished from the I crystalline form, which melts at 130° C. It is thus found that the crystalline conversion of the II form of polybut-1-ene is complete under the conditions of the process according to the invention, whereas this conversion is only partial when these conditions are not followed, in particular if the applied pressure is less than 8 kgf/mm$^2$.

The II crystalline form of the starting material is essentially converted to the I crystalline form by the process according to the invention, but the presence of a melting peak at a temperature of 119° C. is also noted in the differential thermal analysis spectrum of certain press-forged products. Since the X-ray pattern of these products does not show any diffraction peaks characteristic of the II phase, it must be concluded that this melting peak corresponds to the presence of a new, hitherto unknown, phase. It is important to emphasize that this new phase in no way detracts from the stability of the finished products.

The process according to the invention is very useful for the manufacture, at competitive prices, of all kinds of finished articles that have the favorable mechanical characteristics of polybut-1-ene. These articles, such as gears, pipe collars, connectors, pump rotors, wheels, pulleys, and pinions, can be of any size and geometry. The invention therefore also comprises the finished articles that are obtained by the process described above and which it has thus been possible to produce from polybut-1-ene for the first time.

In order that the invention may be more fully described the following examples are given by way of illustration only.

EXAMPLE 1 (comparative)

A press-forging installation was used comprising (1) a hydraulic press capable of applying a force of up to 500 tons and set at a speed of 4 mm/second, (2) a cylindrical die of 50 mm diameter and (3) a punch of the same diameter. A cylindrical blank of isotactic polybut-1-ene homopolymer in the I form was used, which had a melt index of 0.5 g/10 minutes, a diameter of 20 mm and a height of 30 mm. This blank, kept at a temperature of 20° C. before the start of the press-forging operation, was arranged at the bottom of the die, centered on the axis of revolution of the latter. A constant force of 35 tons was applied to the cold punch by means of the press set at the above-mentioned speed. The blank was compressed until it occupied the entire section of the die, after which the force of 35 tons, representing a pressure of 14 kgf/mm$^2$, was maintained for a further 30 seconds. At the end of the operation, the press-forged polybutene roller was extracted from the die and left to stand for 48 hours, after which its dimensions were measured. A height of 6.8 mm and a diameter of 42.0 mm were recorded. These dimensions indicate the extent of the elastic recovery of the polybut-1-ene in the I form, following the press-forging operation, this recovery being measured as the difference between the diameter of the die and the diameter of the stabilized finished article. The extent of this recovery phenomenon renders the I form of polybut-1-ene unsuitable for conversion by press-forging.

EXAMPLES 2 TO 4

The same press-forging installation as in Example 1 was used. Cylindrical blanks of isotactic polybut-1-ene homopolymer in the II crystalline form were used that had a melt index of 0.5 g/10 minutes, an initial diameter $\phi_i$, and an initial height $h_i$, both expressed in millimeters. Each blank was kept in an oven at a constant temperature T°C. until the beginning of the press-forging operation. It was then centered at the bottom of the die on the axis of revolution of the latter, and a constant force corresponding to a pressure P, expressed in kgf/mm$^2$, was then applied to the cold punch by means of the press set at a speed of 4 mm/second. This pressure was maintained for 30 seconds after the blank had been converted into a roller having a section equal to that of the die. The press-forged roller was then extracted from the die and left to stand for 48 hours. After this time, its final diameter $\phi_f$ and its final height $h_f$, both expressed in millimeters, were measured. The results obtained are summarized in Table I below. They show that the press-forging of the II form of polybut-1-ene with high compression ratios, defined as the ratio $(h_i - h_f)/h_i$, ranging up to 84% is not accompanied, in particular under the action of heat, by the high elastic recovery shown by the I crystalline form.

TABLE I

| Example | T °C. | P | $h_i$ | $\phi_i$ | $h_f$ | $\phi_f$ |
|---|---|---|---|---|---|---|
| 2 | 20 | 25.5 | 20.0 | 30.0 | 7.5 | 48.5 |
| 3 | 65 | 12.2 | 40.0 | 25.0 | 9.2 | 50.0 |
| 4 | 65 | 20.4 | 35.0 | 20.0 | 5.5 | 50.0 |

For the purpose of evaluating the dimensional stability, under the action of heat, of the articles press-forged in this way, a roller obtained in accordance with the conditions of Example 3 was placed in an oven kept at a constant temperature of 85° C. and its diameter and its height were measured, to a precision of one hundredth of a millimeter, after a residence time t (expressed in hours) in the oven. The results of these measurements are shown in Table II below.

TABLE II

| t | 0 | 24 | 48 | 144 |
|---|---|---|---|---|
| h | 9.20 | 9.20 | 9.20 | 9.20 |
| φ | 50.00 | 50.00 | 49.84 | 49.84 |

Rollers obtained in accordance with the condition of Examples 3 and 4 were analyzed by X-ray diffraction immediately after they had been extracted from the die. The diffraction spectra revealed the exclusive presence of the I crystalline form of polybut-1-ene, this form being characterized by its peaks at the following diffraction angles $\theta$:

$\theta = 10.2°$ lattice plane (2 1 1)
$\theta = 8.8°$ lattice plane (3 0 0)
$\theta = 5.1°$ lattice plane (1 1 0)

EXAMPLE 5

The press-forging installation of Example 1 was used, but with the cylindrical die replaced by a gear die having a height of 9 mm, an external diameter of 31.3 mm, and an internal diameter of 17.9 mm. A blank of isotactic polybut-1-ene homopolymer in the II crystalline form was used that had a melt index of 0.5 g/10 minutes, a height of 34 mm and a diameter of 20 mm.

This blank was kept in an oven at a temperature of 50° C. until the beginning of the press-forging operation. It was then subjected to a pressure of 20.4 kgf/mm² with the press set at a speed of 4 mm/second, until the material occupied the entire available volume of the die, but, in contrast to the above examples, the pressure was not maintained for a longer time thereafter. The press-forging time in this case was therefore limited to the time necessary for the press, taking account of its speed, to reduce the height of the blank, that is to say 6.25 seconds. The resulting gear was then extracted from the die and the very good uniformity of configuration of the teeth of the gear was immediately noted. After allowing the press-forging to stand for 48 hours, its dimensions were measured and the following values were found: height 9.0 mm, external diameter 31.1 mm, and internal diameter 17.9 mm.

Immediately after extracting the gear from the die, it was analyzed by X-ray diffraction, firstly with a beam passing through the gear at its center, and secondly with a beam passing through a tooth of the gear. The spectrum obtained at the center of the gear possessed both the diffraction peaks of the I phase and those, in particular for $\theta = 9.0°$ and $\theta = 5.85°$, of the II phase, which showed an incomplete crystalline conversion of the material. On the other hand, the spectrum obtained on the tooth only showed the peaks of the I phase.

This difference in behavior between two parts of the gear could have arisen from the fact that there is a minimum flow threshold necessary for the conversion of the II phase into the I phase. This study was completed by a differential thermal analysis carried out on two samples of the same gear, the first being taken from the center and the second from a tooth. The first sample was characterized by a single melting peak at a temperature of 136° C., corresponding to the I phase. The second sample was characterized not only by the melting peak of the I phase at 136° C., but also by the presence of another melting peak at a temperature of 119° C. Taking account of the diffraction spectrum previously run on the tooth, this second melting peak cannot be attributed to the II phase or to the I' phase which, according to the literature, has a melting point of 96° C. It should, therefore, be attributed to a hitherto unknown crystalline phase of polybut-1-ene.

It will be apparent to those skilled in the art that various modifications and variations could be made in the process and article of the invention without departing from the scope or spirit of the invention.

What we claim is:

1. A press-forged polybut-1-ene shaped article made by a process comprising preheating polybut-1ene in the crystalline form II at a temperature between 20° and 90° C. and then press-forging it under a pressure between 8 and 100 kgf/mm² for a period of 1 to 40 seconds into a desired shape.

2. An article according to claim 1 that is completely converted from the crystalline form II.

3. An article according to claim 2, wherein said polybut-1-ene is preheated in the crystalline form II at a temperature between 40° and 80° C.

4. An article according to claim 2, wherein said polybut-1-ene in the crystalline form II is press-forged under a pressure between 12 and 30 kgf/mm².

5. An article according to claim 2, wherein said polybut-1-ene in the crystalline form II is press-forged for a period shorter than 12 seconds.

6. An article according to claim 2, wherein said polybut-1-ene in the crystalline form II is press-forged by means of a cold apparatus.

7. An article according to claim 2, wherein the compression ratio of said polybut-1-ene is between 65% and 85%.

8. An article according to claim 3, wherein said polybut-1-ene is press-forged under a pressure between 12 and 30 kgf/mm².

9. An article according to claim 8, wherein said polybut-1-ene in the crystalline form II is pres-forged for a period shorter than 12 seconds.

10. An article according to claim 8, wherein said polybut-1-ene in the crystalline form II is press-forged by means of a cold apparatus.

11. An article according to claim 8, wherein the compression ratio of said polybut-1-ene is between 65% and 85%.

12. An article according to claim 1 having a melting peak, determined by differential thermal analysis, at 119° C.

* * * * *